(12) United States Patent
Lange et al.

(10) Patent No.: US 6,407,852 B1
(45) Date of Patent: Jun. 18, 2002

(54) REDUCED MANUFACTURING COMPLEXITY OPTICAL CHANNEL CONFIGURATION FOR MULTI-FIBER RIBBON FORM FACTOR-COMPLIANT, INTEGRATED MULTI-CHANNEL OPTICAL AMPLIFIER

(75) Inventors: Michael Ray Lange; Michael O'Reilly, both of Melbourne; Charles E. Bryant, Fellsmere, all of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/785,704

(22) Filed: Feb. 16, 2001

Related U.S. Application Data

(63) Continuation-in-part of application No. 09/627,823, filed on Jul. 28, 2000.

(51) Int. Cl.[7] .................................................. H01B 3/00
(52) U.S. Cl. .................. 359/333; 359/341.1; 359/341.3
(58) Field of Search ................................ 359/333, 349, 359/341.1, 341.3, 341.33, 344, 342; 385/114; 372/6

(56) References Cited

U.S. PATENT DOCUMENTS

| | | | |
|---|---|---|---|
| 5,282,080 A | 1/1994 | Scifres et al. ............... 359/344 |
| 5,396,362 A | 3/1995 | Yakmyshyn et al. ......... 359/245 |
| 5,420,947 A | 5/1995 | Li et al. ........................ 385/37 |
| 5,815,309 A | 9/1998 | Lawrence et al. ........... 359/333 |
| 5,854,865 A | 12/1998 | Goldberg ...................... 385/31 |
| 5,892,857 A | 4/1999 | McCallion ...................... 385/1 |
| 5,946,433 A | 8/1999 | Yamamoto et al. ............ 385/36 |
| 5,978,531 A | 11/1999 | Funabashi ..................... 385/45 |
| 5,982,961 A | 11/1999 | Pan et al. ...................... 385/30 |
| 6,021,239 A | 2/2000 | Minami et al. ................ 385/36 |
| 6,026,205 A | 2/2000 | McCallion et al. ........... 385/30 |
| 6,052,220 A | 4/2000 | Lawrence et al. ........... 359/341 |
| 6,229,939 B1 * | 5/2001 | Komine ........................ 385/29 |
| 6,289,027 B1 * | 9/2001 | Lawrence et al. ............. 372/6 |

* cited by examiner

*Primary Examiner*—Mark Hellner
(74) *Attorney, Agent, or Firm*—Allen, Dyer, Doppelt Milbrath & Gilchrist, P.A.

(57) ABSTRACT

A multi-fiber ribbon-coupled multi-channel, optical amplifier architecture has a compact form factor for coupling to a multi-fiber ribbon. A single clad fiber is pulled to a prescribed diameter based upon the geometry and dimensions of the inner clad of a clad-pumped fiber. The single clad fiber is affixed in a V-shaped groove in a waveguide substrate, by optical fiber bonding epoxy back-filled in the groove, and which wicks around the single clad fiber. After the epoxy cures, any fiber and epoxy above the substrate are removed down to its surface.

12 Claims, 5 Drawing Sheets

REDUCED MANUFACTURING COMPLEXITY OPTICAL CHANNEL CONFIGURATION FOR MULTI-FIBER RIBBON FORM FACTOR-COMPLIANT, INTEGRATED MULTI-CHANNEL OPTICAL AMPLIFIER

CROSS-REFERENCE TO RELATED APPLICATION

The present application is a continuation-in-part of co-pending U.S. patent application Ser. No. 09/627,823, filed Jul. 28, 2000, by M. Lange et al, entitled: Multi-Fiber Ribbon Form Factor-Compliant, Integrated Multi-Channel Optical Amplifier" (hereinafter referred to as the '823 application), assigned to the assignee of the present application and the disclosure of which is incorporated herein.

FIELD OF THE INVENTION

The present invention relates in general to fiber optic communication systems and components therefor, and is particularly directed to an augmentation of the V-groove-installed, optically pumped waveguide amplifier channels employed in the integrated optical amplifier architecture described in the above-referenced '823 application. Rather than configure a respective waveguide amplifier channel pulled from a compound glass structure, containing both a core and a substantial volume of cladding material, comprised of an inner cladding layer surrounded by an outer cladding layer, surrounding the core, the present invention places a single inner clad core directly into a respective V-groove. The inner clad core is inserted into the V-groove so as to allow fiber optic adhesive, such as low refractive index epoxy, to be supplied to and/or allowed to form around the inner clad, and thereby physically secure the fiber in the groove and also provide an optical pump beam-confining, outer pseudo-cladding around the inner clad. The resulting structure may then be lapped to a planar surface through which optical pumping energy is introduced.

BACKGROUND OF THE INVENTION

Because of bundle density limitations associated with the individual buffered fibers and connector interface configurations of legacy, single mode optical fiber cables (a reduced complexity cross-section of one of which is shown at 10 in FIG. 1), especially those containing a relatively large number of 'fiber' strands, optical communication equipment and component suppliers have begun offering relatively thin, or flat multiple optical fiber-containing ribbons and small form factor multi-channel connector interfaces. As further shown in FIG. 2 the flat, rectangular cross-section of such a multi-fiber ribbon 20 facilitates densely packing a relatively large number of such fibers 21 within a physical volume that is both compact and readily conformal with a variety of housing and equipment surfaces.

Unfortunately, when employed in applications requiring amplification of optical signals transported by the various fibers of the ribbon cable, such as in long haul repeaters, it is necessary to break out each individual fiber 21 from the ribbon, as illustrated in FIG. 3, and then connect each fiber to its own dedicated optical amplifier unit. Such an optical amplifier unit, a block diagram of which is shown in FIG. 4 and an optical fiber signal transport view of which is shown in FIG. 5, is typically a relatively large sized and costly piece of equipment.

These size and cost drawbacks are due to the number of individual fiber-interfaced components employed, long loops 31 of optical pumping energy absorbing and amplifying material (such as erbium-doped fiber) required for gain, the need for relatively narrow spectrum, distributed feedback laser diode pumps 32 (which require thermoelectric coolers and associated control circuits therefor), as well as the substantial hand labor necessary to physically interface individual components and the input and output ports 33, 34 of each amplifier unit with a respective fiber of the ribbon fiber bundle.

Advantageously, these and other shortcomings of conventionally having to use individual fiber-dedicated light amplifiers are effectively obviated by the multi-fiber ribbon-interfaced optical amplifier architecture described and shown in the '823 application, respective diagrammatic side and tops views of a prism-coupled embodiment of which are shown in FIGS. 6 and 7. As shown therein, the main body of this improved multi-fiber ribbon-interfaced amplifier comprises a support substrate 40 made of a bulk material such as a glass, and having a generally planar surface 41, in which a plurality of spatially adjacent (e.g., parallel) optical waveguide channels 43 are formed.

The waveguide channels 43 are optically coupled with an array of pumping energy sources 74, whose optical pumping energy outputs are introduced into the optical waveguide channels by means of a multi-channel optical interface 70 arranged adjacent to the substrate surface 41. As a non-limiting example, the substrate 40 may contain twelve optical waveguide channels 43, corresponding to the number of (single mode, nominal 1550 nm wavelength) fibers within currently commercially available, reduced form factor multi-optical fiber ribbons. For purposes of reducing the complexity of the drawings, the partial diagrammatic plan view of FIG. 7 shows six of the twelve waveguide channels 43 in the support substrate 40.

The optical waveguide channels 43 have mutually adjacent center-to-center spacings that conform with mutually adjacent, center-to-center (nominally 250 microns) spacings 54 of the optical fibers 53 of an 'upstream' (multiple input signal-conveying) section of industry standard, multi-optical fiber ribbon 50-1, and a 'downstream' (multiple amplified signal-conveying) section of multi-fiber ribbon 50-2. In order to effect mechanical and optical end coupling between respective sections 50-1 and 50-2 of multi-fiber ribbon and optical waveguide channels 43 of the substrate 40, multi-fiber ribbon interface connectors 55 and 56 may be employed.

The relatively narrow (widthwise) dimensions of the components of this multi-channel fiber optic amplifier allow the amplifier to be configured such that its width-wise dimension essentially conforms with that of a section of reduced form factor multi-fiber ribbon. The resulting form factor of this highly integrated optical amplifier architecture is considerably reduced compared to conventional cable-installed structures, which require a separate break-out to a dedicated amplifier device for each fiber strand, as described above. For a twelve channel application, the overall width of the multi-channel optical amplifier may be slightly larger than three millimeters.

FIG. 8 is a partial perspective view of an optical waveguide channel and an associated pumping energy source, such as that contained in an M×N spatial array of pumping energy sources, as well as a portion of the optical interface used to image the output of the pumping source into the channel. As shown therein, a respective optical waveguide channel 43 comprises a central (signal transport) core 62, through which a signal light beam from an upstream ribbon fiber propagates, and an adjacent inner cladding layer 61, with an outer cladding layer 63, that partially surrounds the core 62. The signal transport core 62 is dimensioned to have a cross section that may nominally conform with that of an associated ribbon fiber, so that the core 62 serves as the principal signal transport medium and amplifying medium through the amplifier for a signal light beam coupled thereto from a respective ribbon fiber of the input multi-fiber ribbon section 50-1.

For this purpose, the core 62 may comprise an optically transmissive material whose photonically stimulated, energy state transfer properties readily absorb optical energy supplied by a one or more light amplification pumping sources (such as pumping sources that emit a nominal 980 nm optical beam) and provides emitted radiation-stimulated amplification of the (nominal 1550 nm) signal beam. As a non-limiting example of a suitable material, the core 62 may comprise erbium ytterbium-doped phosphate glass (e.g., phosphate glass containing 22% $Yb^{3+}$ and 2.2% $Er^{3+}$).

The inner cladding 61 surrounding the core 62 may comprise a glass material, that is like or similar to that of the core, but is undoped, and having a slightly lower index of refraction. The cladding layer 61 serves to both improve the focusing tolerance window upon which one or more pumping optical energy beams are imaged for amplifying the signal beam propagating in the core 62, and allows an increase in power density (watts/cm$^2$) of the incident pumping source beam along the gain interaction length of the core. This clad core waveguide structure may be formed by a controlled implantation of silver (Ag) ions through a metalized masked planar glass surface, or pulled into a fiber from a multiple clad preform of phosphate glass, to form a clad and a core region having an elevated optical index with Yb/Er dopant concentration in the core.

As further shown in the perspective view of FIG. 9, in order to accurately align and place each of the optical waveguide channels in the support substrate, so that their center-to-center channel spacings match the center-to-center spacings of the optical fibers of a multi-fiber ribbon, a plurality of spatially adjacent (e.g., parallel) 'V'-shaped grooves 65 may be patterned (e.g., etched) in the surface 41 of the substrate 40, in spatial alignment with the required channel separation pattern. The V-shaped grooves 65 are sized to receive and retain the clad core-configured channels 43, which may be affixed in the grooves by means of a suitable fiber optic epoxy, such as Armbruster's UVA040 optical grade epoxy.

In order to conform with the intended reduced (multi-fiber ribbon width-based) form factor, spatially adjacent (e.g., parallel) beams of optical pumping energy are coupled (focussed) into the respective optical waveguide channels 43 of the substrate 40 from a direction that is generally optically transverse to the channels, namely, in a direction that forms an acute angle with the direction of a waveguide channel, and is typically greater than zero and less than or equal to 90°.

As shown in FIGS. 6 and 7, and in enlarged detail in the side view of FIG. 10, the multi-channel optical interface 70 may be arranged immediately adjacent to the substrate surface 41 in which the channels 43 are formed, and may be configured to receive a plurality of pumping energy light beams 72 from a plurality (e.g., M×N spatial array) of spatially adjacent pumping energy sources 74.

As a non-limiting example, the pumping energy sources 74 may comprise a 1×N (one-dimensional), or M×N (two-dimensional) array of diode-laser emitter elements, such as but not limited to edge-emitting laser diodes, vertical cavity surface emitting laser (VCSEL) elements, and the like. While a 1×N array of pumping energy sources may be sufficient for the purpose, an M×N array is preferred, since a two dimensional array provides additional power using lower cost components, as well as providing redundant pumping sources for each channel. Each pumping source element may generate a nominal 980 nm output optical beam, that is readily absorbed by Yb/Er doped material of the channel, so as to produce therein the desired stimulated emission of (1550 nm) photons for amplifying the (nominal 1550 nm) signal beam.

As the light beams from the pumping energy emitters 74 diffract or 'spread', and propagate generally transverse to the axes of the channels 43, it is necessary to focus and redirect the pumping energy of each emitted beam, so that the output of each pumping element is optimally coupled into only its associated optical waveguide channel. As shown in FIGS. 8 and 10, this defined pumping energy coupling may be achieved by the combination of an M×N array of micro-lenses or diffractive optic elements (DOEs) 81 distributed over (e.g., directly etched into or provided on a separate light transmissive layer that is attached to) a pumping beam-receiving surface 83 of a prism element 80.

Each micro-lens or DOE 81 focuses a respective pumping energy beam along a prescribed refraction path 84 through the bulk material of and onto a generally planar surface 85 of the prism 80, that directly abuts the planar surface 41 of the channel-supporting substrate. The parameters of the focussing elements (e.g., micro-lenses, DOEs) and the geometry and refractive index of the prism 80 are defined such that each focussed pumping beam emerges from the prism surface 85 in a direction through the optical waveguide channel 43 that effectively redirects and confines the pumping beam to the optical waveguide channel.

Because each pumping beam for a respective channel is refracted through the prism-waveguide interface 85, it emerges from that surface and couples into its associated optical waveguide channel at a respectively different angle. As shown by the sequence of arrows 87, 88 and 89 in FIG. 10, the coupling angle for each pumping energy beam entering the waveguide channel 43 from the prism 80 is such that the pumping energy is confined to the channel, and undergoes multiple reflections, one of which is shown at 91, as the beam repeatedly passes back and forth between the outer cladding layer 63 and the signal-transporting core 62, where the pumping energy is absorbed, during its propagation along the channel.

As pointed out above, as the energy in the 980 nm pumping beam 72 is absorbed by the doped Yb/Er glass of the core, the photonically stimulated energy state transfer properties of the core provide emitted radiation-stimulated amplification of the 1550 nm signal beam propagating through the core 61. For the illustrated example, which uses a standard input signal wavelength of 1550 nm and a pumping energy wavelength of 980 nm, a substrate length on the order of four to eight centimeters has been found to provide both amplification of a signal beam by the energy contained in its associated pumping beams, as well as a relatively compact form factor in the lengthwise direction of the amplifier.

FIG. 11 illustrates a modification of the above amplifier architecture, in which the prism and focusing lens array described above are replaced by an array 90 of gradient indexed (GRIN) lenses. This GRIN lens array 90 is supported by a mounting fixture, not shown, between the pumping energy source array and the planar surface 41 of the substrate 40 containing the optical waveguide channels of the amplifier. The number of lenses of the GRIN lens array 90 corresponds to the number of pumping source elements 74, so that there is a one-for-one focusing of the light beams 72 generated by the pumping energy emitters 74 into the optical waveguide channels 43.

Like the prism and associated micro-lens array architecture described above, the optical coupling functionality of the GRIN lens array 90 causes each pumping beam 72 to be focussed into a respective optical waveguide channel 43 in a direction that effectively confines the injected pumping beam within the waveguide channel as it propagates down the channel, so that the energy in the pumping beam will be transferred to and thereby amplify the signal beam.

FIG. 12 shows a further modification of the optical amplifier of FIG. 10, in which the prism and focusing lens array are replaced by an array 100 of lenslets, such as spherical lenslets 102. As in the embodiment of FIG. 11, the lenslet array 100 is interfaced to, or etched in the surface of a prism, similar to prism 80 in FIG. 10, and may be supported by a mounting fixture, not shown, that is installed between the pumping energy source array 74 and the planar surface 41 of the substrate 40 containing the optical waveguide channels 43 of the amplifier. The number of lenslets 102 of the array 100 preferably corresponds to the number of pumping source elements 74, so that there is a one-for-one focusing of the light beams 72 generated by the pumping energy emitters 74 into the optical waveguide channels 43.

In each of the above embodiments of the '823 application, regardless of the scheme used to inject pumping energy into a respective channel, the signal transport core of a respective optical waveguide is surrounded by a multiple cladding layer of substantial thickness. Now although such a clad core structure may be formed by a controlled ion implantation through a masked planar glass surface, or pulled into a fiber from a multiple clad preform of phosphate glass, such processes require high precision parameter controls, and attendant cost. It would be desirable to implement the optical waveguide channel architecture using a less complex and less costly process.

SUMMARY OF THE INVENTION

In accordance with the present invention, this objective is successfully achieved by replacing the multi- or compound clad optical fiber configuration of an individual channel with a smaller single clad optical fiber. Rather than pull a compound fiber from a multiple clad preform, having both an annular multi-cladding region surrounding a core region of elevated optical index with Yb/Er dopant concentration in the core, the present invention employs a single clad fiber, such as one pulled to a prescribed diameter based upon the geometry and dimensions of the inner clad of the '823 application, and placed directly in a respective V-shaped groove in the waveguide support substrate.

In order to secure the fiber within the V-shaped groove, a generally stripe-shaped bead layer of low refractive index, optical fiber bonding epoxy may be initially deposited or back-filled in the bottom of the groove. While the optical epoxy bead layer need not completely fill the groove its thickness is such as to cause it to 'wick' around the outer surface of the optical fiber as the fiber is inserted into the groove, so that its outer surface is constrained by the inclined walls of the groove. During insertion, the fiber pushes into the back fill epoxy, which causes the low refractive index epoxy bead layer to adhere to and travel up or wick along the outer surface of the fiber. This wicking action causes the epoxy to partially surround the fiber up to at least the level of the top of the groove at the planar surface of the substrate.

Once so formed (wicked around) the core layer, the epoxy outer (cladding) layer is allowed to cure, thereby firmly anchoring the core layer in the V-groove. After curing, that portion of the optical fiber and associated epoxy cladding material which extend or project above the surface of the bulk material of the substrate are removed down to a level that is effectively coplanar with the substrate surface. This lapping operation leaves a truncated optical waveguide channel comprised principally of the lapped core as well as the immediately adjacent lapped epoxy layer.

Since both of these layers are surface-conformal at a generally planar surface of the optical waveguide channel, which is effectively coplanar with the surface of the support substrate, the planar surface of the optical channel can now be readily optically coupled with an associated pumping energy source, such as any of the optical pumping source configurations described above with reference to the '823 application.

DETAILED DESCRIPTION

Figure 1:
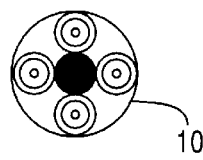
FIG. 1 is a reduced complexity cross-sectional illustration of a conventional single mode optical fiber cables.
Figure 2:
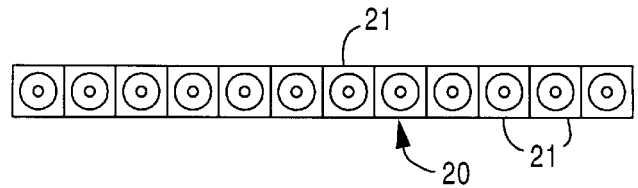
FIG. 2 diagrammatically illustrates the cross-section of a multi-optical fiber ribbon.
Figure 3:
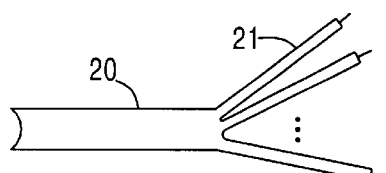
FIG. 3 diagrammatically illustrates a break out of individual optical fibers from a multi-fiber ribbon.
Figure 4:
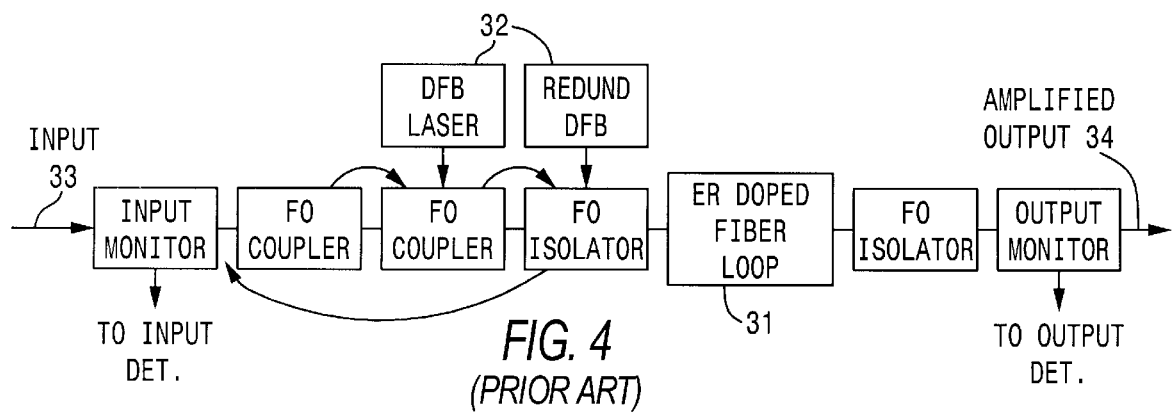
FIG. 4 is a component block diagram of a conventional optical fiber amplifier.
Figure 5:
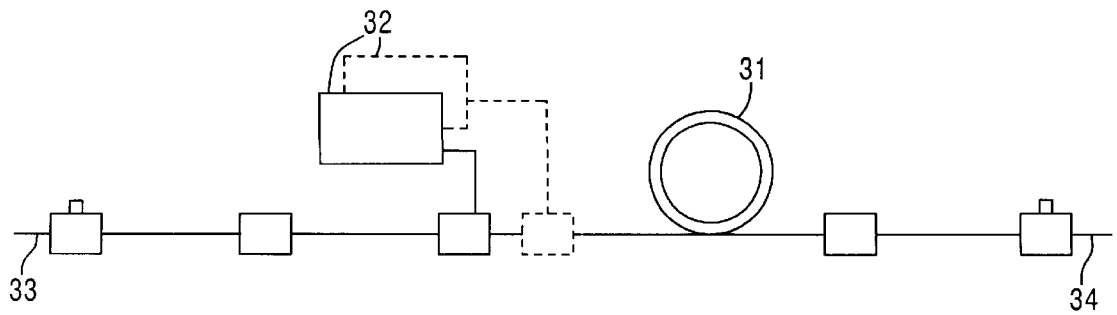
FIG. 5 is a diagrammatic optical fiber signal transport view of the optical fiber amplifier of FIG. 4.
Figure 6:
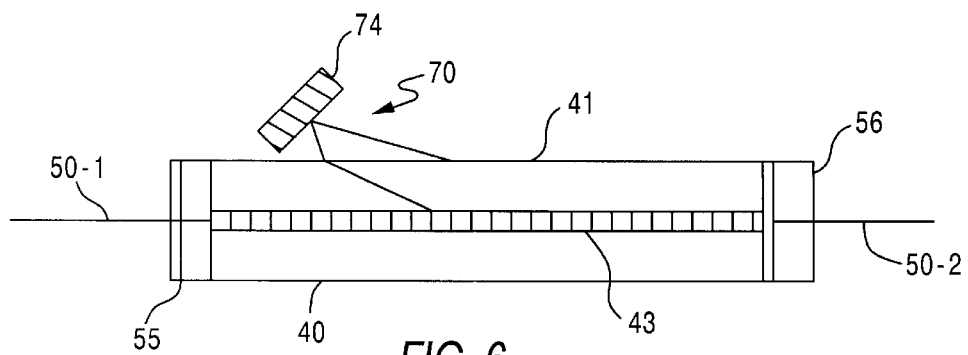
FIG. 6 is a diagrammatic side view of an embodiment of the multi-channel optical fiber ribbon-coupled optical amplifier disclosed in the above-referenced '823 application.
Figure 7:
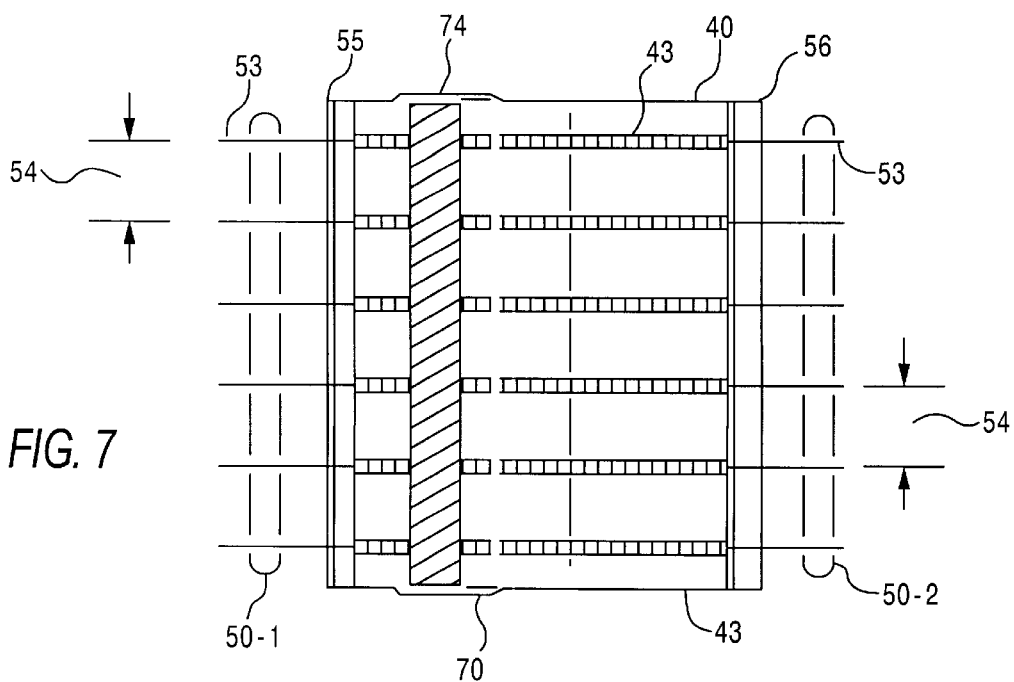
FIG. 7 is a partial diagrammatic plan view of the multi-channel optical amplifier of FIG. 6.
Figure 10:
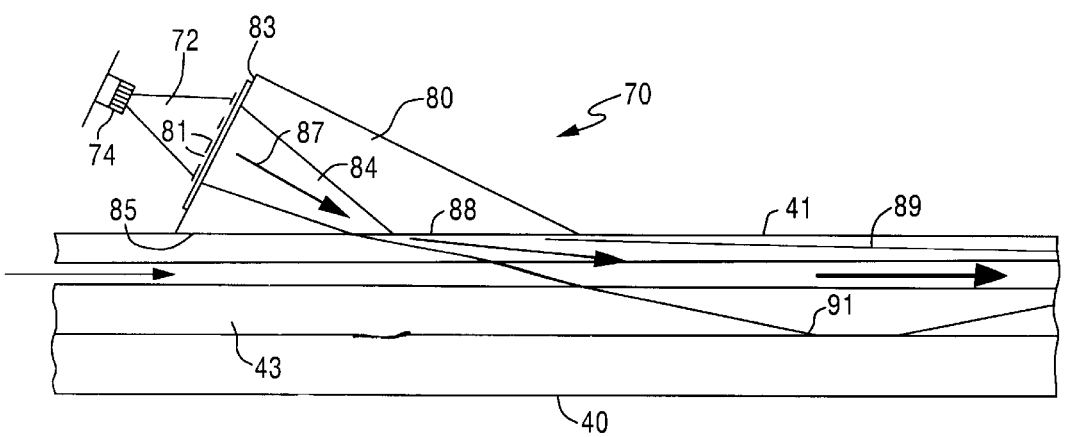
FIG. 10 shows a prism-coupled embodiment of the optical amplifier disclosed in the '823 application.
Figure 8:
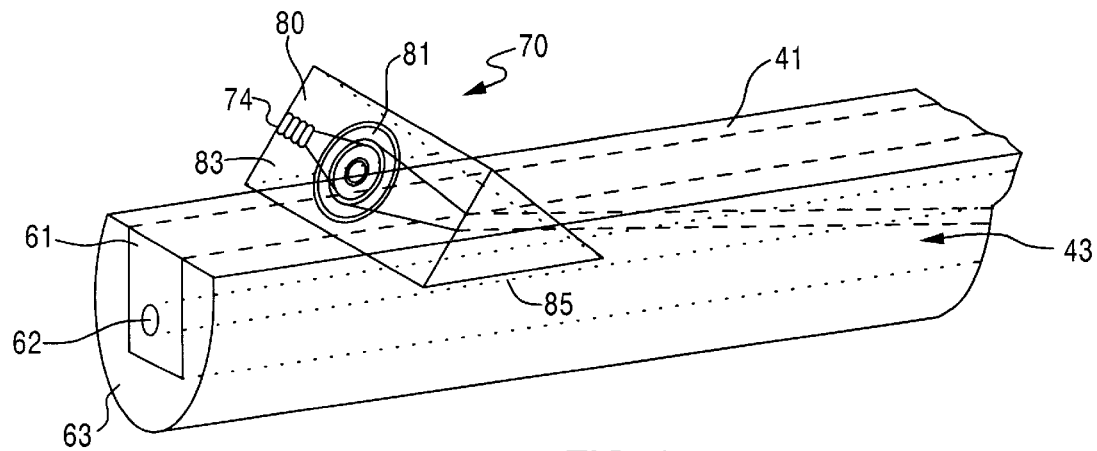
FIG. 8 is a partial perspective view of an optical waveguide channel employed in the optical amplifier of FIG. 6.
Figure 9:
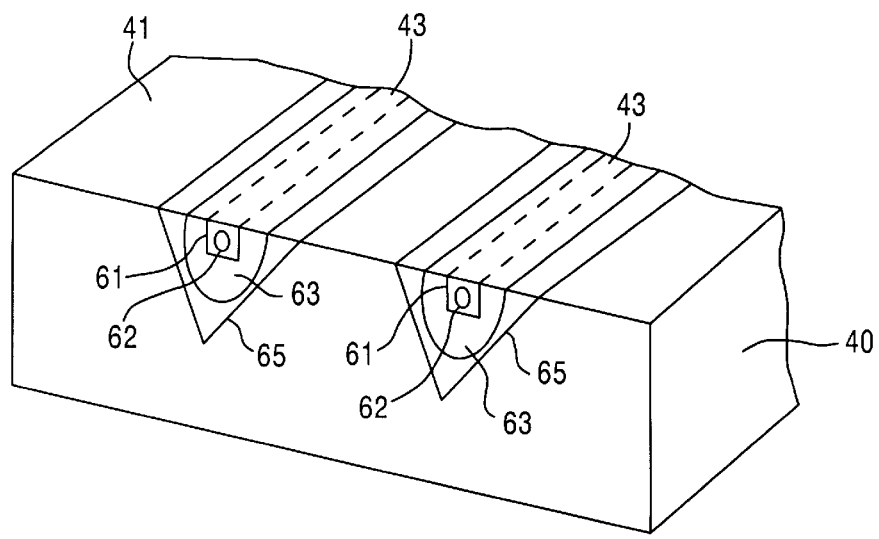
FIG. 9 shows a plurality of 'V'-shaped grooves patterned in an optical amplifier substrate, and containing multi-clad core-configured optical amplifier channels.
Figure 11:
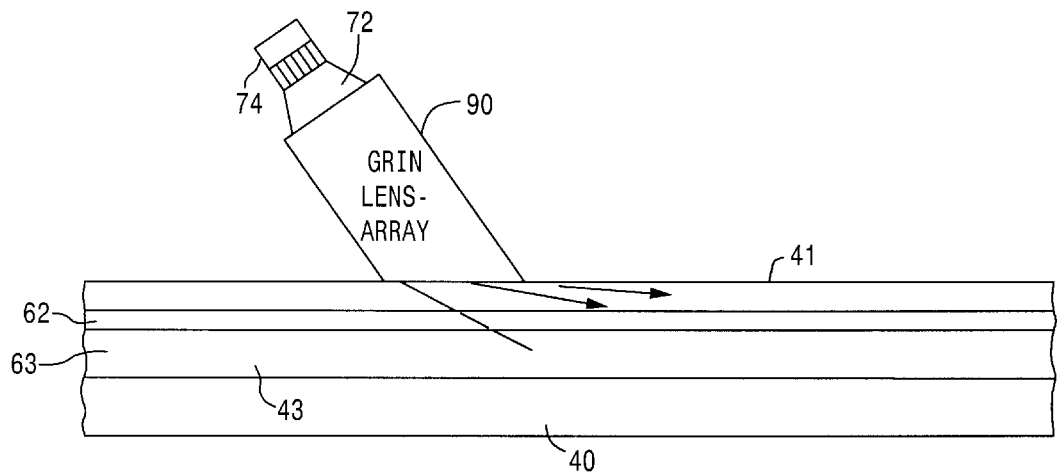
FIG. 11 illustrates a GRIN lens-coupled embodiment of the optical amplifier disclosed in the '823 application.
Figure 12:
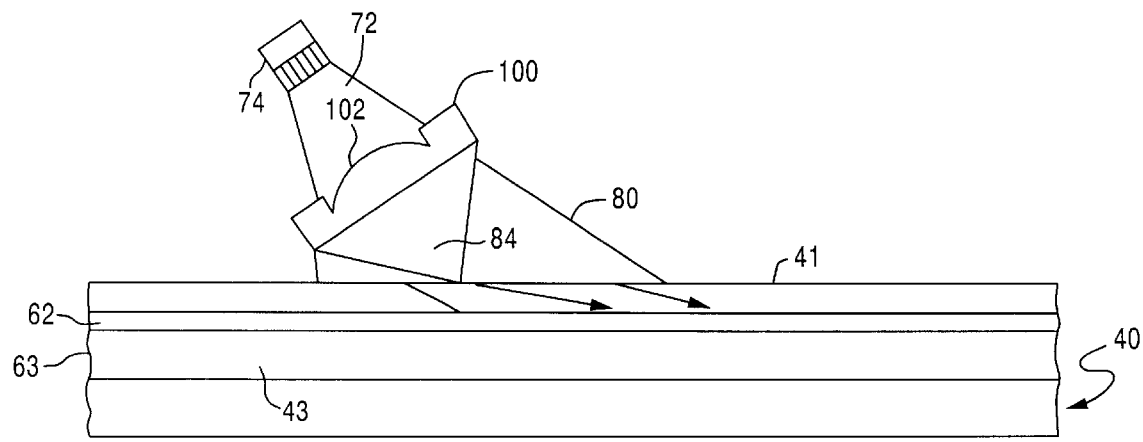
FIG. 12 illustrates a spherical lenslet array-coupled embodiment of the optical amplifier disclosed in the '823 application.
Figure 13:
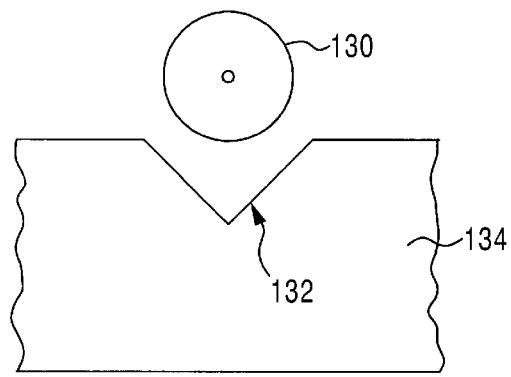
FIGS. 13–17 depict an individual optical waveguide channel at respective stages of its manufacture in accordance with an embodiment of the present invention.

Attention is now directed to FIGS. 13–17, which are diagrammatic end views showing respective stages of manufacture of an individual optical waveguide channel in accordance with the present invention, that may be readily employed in a multi-channel optical fiber ribbon-coupled optical amplifier of the type disclosed in the above-referenced '823 application. As described briefly above, pursuant to the present invention, the compound optical fiber configuration of a respective optical waveguide channel, of the type shown in FIG. 9 as including both a central core 62 and a surrounding multiple cladding layer 61 and 63, is replaced with a single clad optical fiber.

More particularly, rather pulling a multi-layer (central core and multiple coaxial annular cladding) from a multiple clad glass preform, which contains both a multi-clad region surrounding a core region having an elevated optical index with Yb/Er dopant concentration in the core, an initial single clad fiber 130 (such as one having a cylindrical configuration to ensure center-to-center groove alignment) is pulled to a prescribed diameter based upon the geometry and dimensions of the inner clad of the '823 application, and placed directly in a respective V-shaped groove 132 in the waveguide support substrate 134. For the parameters of the amplifier example of FIGS. 6–12 (having a center-to-center spacing on the order of 250 microns and a V-groove depth on the order of 35–40 microns), the clad fiber 130 may have a diameter on the order of 40 microns.

Figure 14:
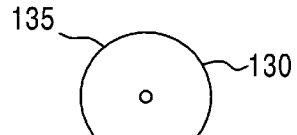
Figure 14:
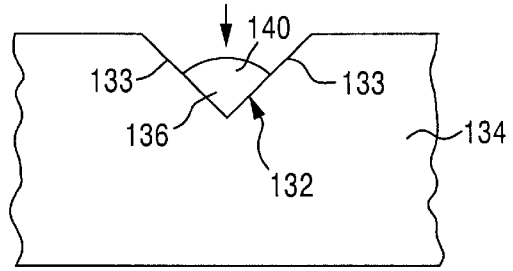

In order to physically affix the fiber 130 within the groove 132, a generally stripe-shaped bead layer 140 of low refractive index, optical fiber-bonding epoxy (such as the above-referenced Armbruster's UVA040 optical grad epoxy, referenced above) may be initially deposited or back-filled in the bottom 136 of the groove 132, as shown in FIG. 14. While the optical epoxy bead layer 140 need not completely fill the groove 132, the thickness to which it is deposited is such as to cause it to be displaced by and thereby 'wick' around the outer surface 135 of the fiber 130, as the fiber 130 is inserted into the groove, to a depth that its outer surface 135 becomes constrained by the inclined walls 133 of the groove.

Figure 15:
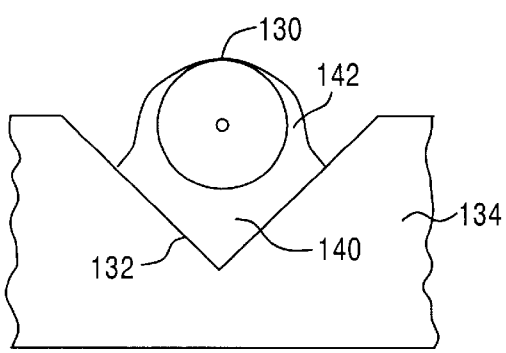

As shown in FIG. 15, as the fiber 130 is inserted into the groove 132 (partially filled with epoxy material 140 as described above) and 'pushes into' the bead material 140, the impinged-upon low refractive index epoxy bead layer will adhere to and travel up or 'wick' along the outer surface 135 of the fiber 130, so as to at least enclose or partially surround the fiber 130, up to at least the level of the planar surface 137 of the substrate 134. This 'wicking' of the epoxy around the optical epoxy layer 140 results in an optical epoxy 'pseudo'-cladding layer 142, that adheres to both the fiber 130 and the inclined surfaces 133 of the V-shaped groove 132 and the cylindrical surface 135 of the fiber proper. Once so formed (wicked around) the fiber clad layer 130, the epoxy (pseudo-cladding) layer 142 is allowed to cure, thereby retaining the fiber cladding 130 in the V-groove 132.

Figure 16:
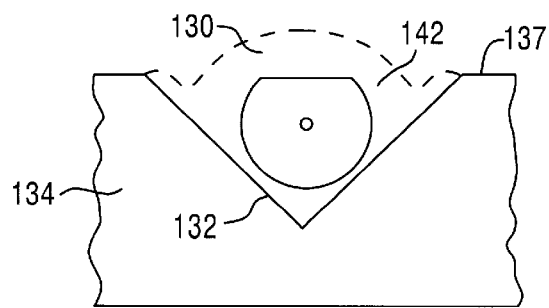
Figure 17:
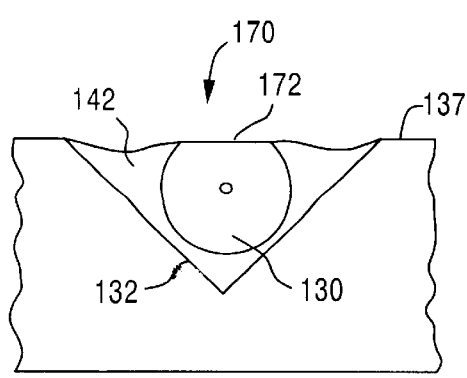

Next, as shown in FIG. 16, that portion of the optical fiber 130 and its associated epoxy cladding layer 140, which extend or project above the surface 137 of the bulk material of the substrate 134, shown in broken lines, are removed (for example by mechanical abrading and polishing), down to a level that is effectively coplanar with the surface 137. As shown in FIG. 17, this lapping operation leaves a truncated optical waveguide channel 170, comprised principally of the lapped inner cladding 130, and the immediately adjacent lapped pseudo-cladding layer 142.

Since both of these layers are surface-conformal at a generally planar surface 172 of the channel 170, which is effectively coplanar with the surface 137 of the support substrate 134, the planar surface 172 of the optical channel 170 can now be optically coupled with an associated pumping energy source. As a non-limiting example, the optical pumping source may comprise any of the optical pumping source configurations of FIGS. 6, 8 and 10–12.

As will be appreciated from the foregoing description, by replacing a respective multi-clad waveguide amplifier channel, such as one that has been pulled from a compound glass structure, with a single clad core that may be affixed directly into a respective V-groove and then lapped to form a planar surface through which pumping energy is introduced into the signal beam-transporting core, the invention provides a relatively low complexity and reduced cost process for implementing the optical waveguide channel architecture described in the above-referenced '823 application.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A multi-fiber ribbon-coupled optical amplifier comprising:

a multi-channel optical waveguide structure having a plurality of optical waveguide amplifier channels arranged to be optically coupled with respective ones of a plurality of optical fibers of a multi-fiber ribbon over which respective light beam signals are transportable; and a multi-channel optical interface configured to couple optical energy supplied by a plurality of optical pumping sources into respective ones of said plurality of optical waveguide amplifier channels of said multi-channel optical amplifier from a direction that is generally spatially transverse to said optical waveguide amplifier channels, so as to provide optical energy amplification of said respective light beam signals traveling through said optical waveguide amplifier channels of said multi-channel optical waveguide structure; and wherein said multi-channel optical waveguide structure comprises a support substrate having a first surface, in which are formed a plurality of spatially adjacent grooves supporting therein respective ones of said optical waveguide amplifier channels, and wherein a respective one of said plurality of optical waveguide amplifier channels comprises a single clad optical fiber installed in a respective one of said grooves and having a truncated surface adjacent to a top surface of said respective one of said grooves, so as to receive optical energy supplied by one or more of said optical pumping sources, whereby said optical energy is transferred into and propagated along the core by said single clad optical fiber, and thereby provides optical energy amplification of a respective light beam signal traveling in the core.

2. A multi-fiber ribbon-coupled optical amplifier according to claim 1, wherein said single clad optical fiber is affixed in said respective one of said grooves by an optical fiber epoxy that otherwise fills said respective one of said grooves, being contiguous with said single clad optical fiber and walls of said respective one of said grooves up to said top surface thereof.

3. A multi-fiber ribbon-coupled optical amplifier according to claim 2, wherein said grooves are generally V-shaped grooves.

4. A multi-fiber ribbon-coupled optical amplifier according to claim 1, further comprising a multi-fiber ribbon input coupler adapted to optically couple light beam signals traveling through respective ones of a plurality of input optical fibers of a multi-fiber ribbon with respective ones of said optical waveguide amplifier channels of said multi-channel optical waveguide structure.

5. A multi-fiber ribbon-coupled optical amplifier according to claim 1, further comprising a multi-fiber ribbon output coupler adapted to optically couple amplified light beam signals traveling through respective ones of said plurality optical waveguide amplifier channels of said multi-channel optical waveguide structure with respective ones of a plurality of output optical fibers of a multi-fiber ribbon.

6. A multi-fiber ribbon-coupled optical amplifier according to claim 1, wherein said multi-channel optical interface includes an array of diffractive optic elements.

7. A multi-fiber ribbon-coupled optical amplifier according to claim 6, wherein said multi-channel optical interface comprises a prism-configured optical energy coupler having a plurality of optical energy focusing elements upon which optical outputs emitted by said plurality of optical pumping sources are incident, and which are operative to focus energy of said optical outputs through said prism and coupled into said truncated clad optical fibers of said multi-channel optical amplifier.

8. A multi-fiber ribbon-coupled optical amplifier according to claim 1, wherein said multi-channel optical interface includes a plurality of GRIN lenses upon which optical outputs emitted by said plurality of optical pumping sources are incident, and which are operative to focus energy of said optical outputs emitted by said plurality of optical pumping sources into said truncated clad optical fibers of said multi-channel optical amplifier.

9. A multi-fiber ribbon-coupled optical amplifier according to claim 1, wherein said multi-channel optical interface includes an array of focusing lenslets upon which optical outputs emitted by said plurality of optical pumping sources are incident, and which are operative to focus energy of said optical outputs emitted by said plurality of optical pumping sources into said truncated optical fibers of said multi-channel optical amplifier.

10. A method of making a multi-channel optical waveguide structure comprising the steps of:
    (a) providing a support substrate having a first surface, in which are formed a plurality of spatially adjacent grooves;
    (b) providing a plurality of clad optical fibers sized to confine optical pumping energy near the core and to be insertable into said spatially adjacent grooves;
    (c) securing said clad optical fibers in said grooves by means of optical fiber bonding adhesive material which, together with said clad optical fibers, fill said grooves at least up to said first surface; and
    (d) removing material of said clad optical fibers and any adjacent adhesive down to said first surface of said substrate, so as to provide a plurality of optical waveguide channels comprised of truncated ones of said clad optical fibers and immediately adjacent adhesive material that allow said clad optical fibers to be optically coupled with an associated pumping energy source.

11. A method according to claim 10, wherein step (c) comprises forming low refractive index adhesive material in said grooves, and inserting said clad optical fibers into said adhesive material in such a manner that causes adhesive material to wick around the outer surface of a respective clad optical fiber, as said respective clad optical fiber is inserted into a groove and, wherein step (d) comprises, subsequent to curing of said adhesive, planarizing that portion of said clad optical fiber and any associated adhesive material which extends above said surface of said substrate down to the level of said surface of said substrate.

12. A method according to claim 11, wherein said grooves are generally V-shaped grooves.

* * * * *